Figure 1:
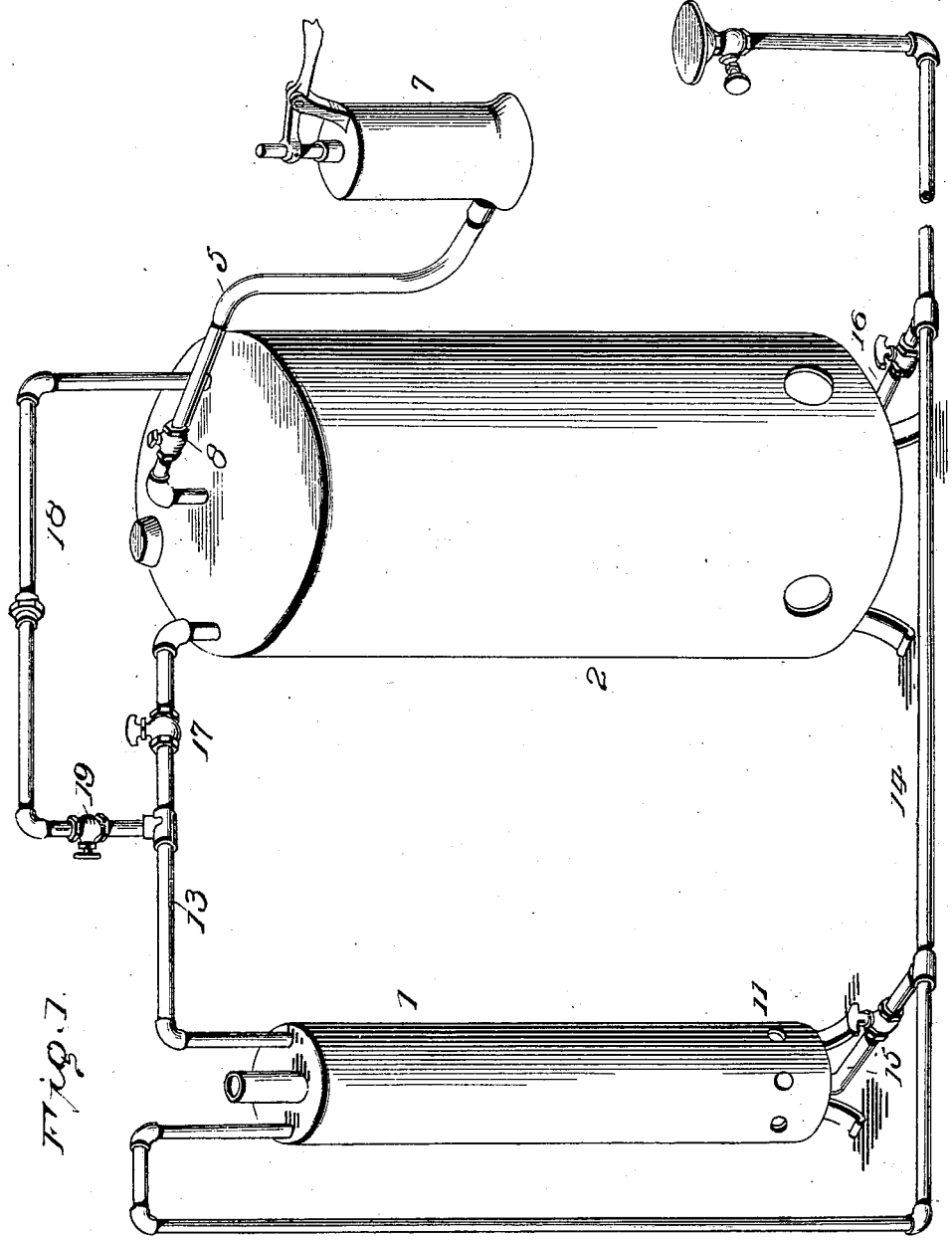

No. 689,460. Patented Dec. 24, 1901.
J. G. CLARK & G. COTHRAN.
CARBURETER.
(Application filed Mar. 23, 1901.)
(No Model.) 2 Sheets—Sheet 1.

No. 689,460. Patented Dec. 24, 1901.
J. G. CLARK & G. COTHRAN.
CARBURETER.
(Application filed Mar. 23, 1901.)
(No Model.) 2 Sheets—Sheet 2.
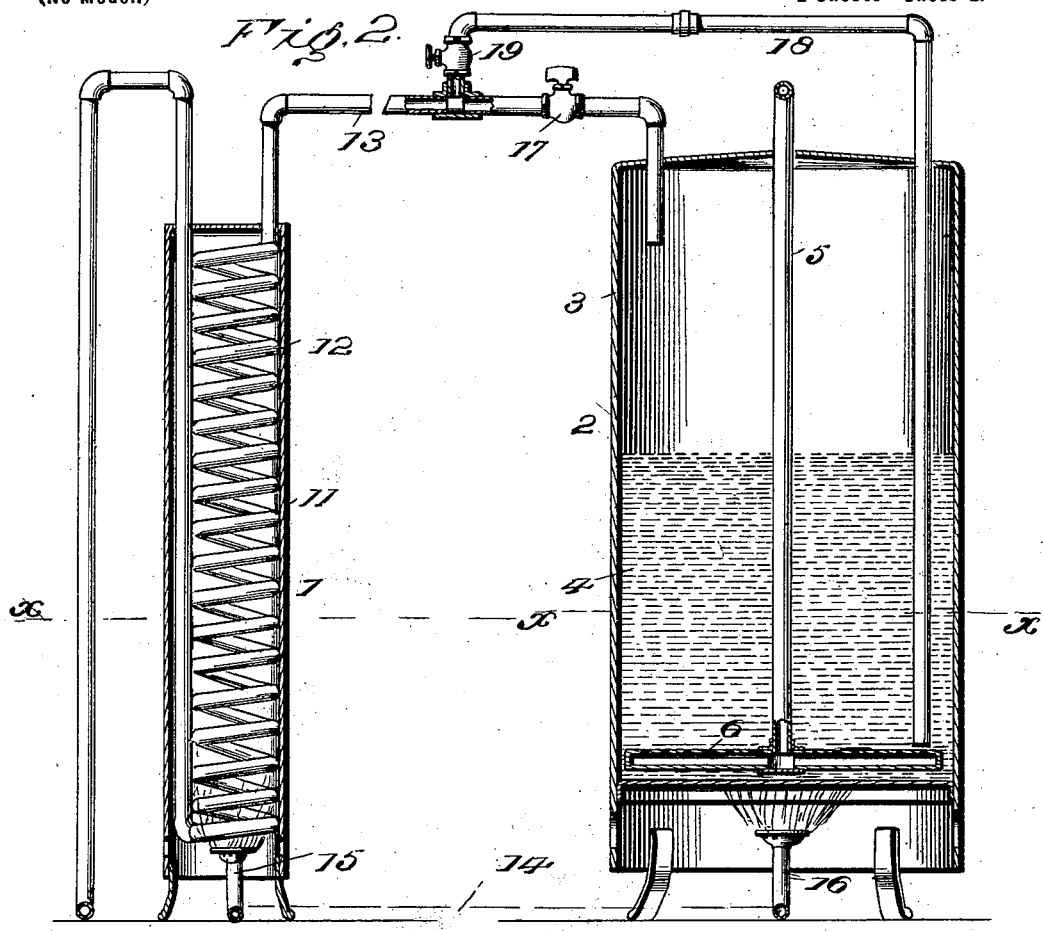
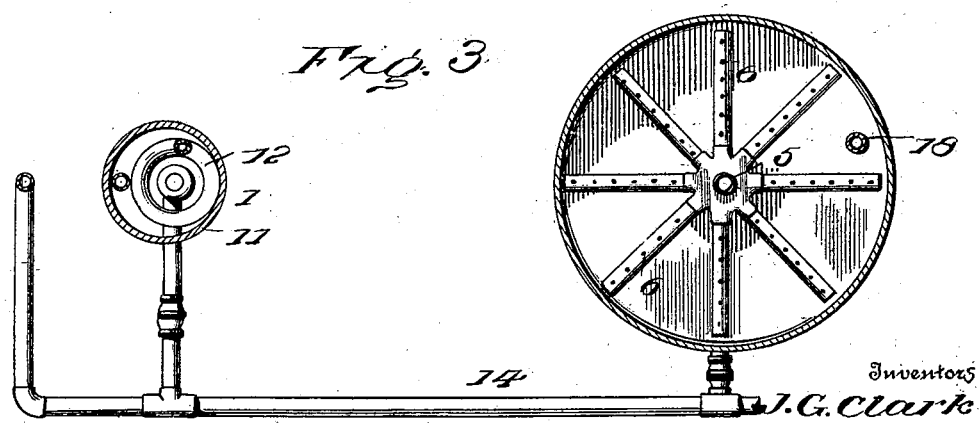
Witnesses
Inventors
J. G. Clark
G. Cothran
By Lacy, Attorneys

UNITED STATES PATENT OFFICE.

JAMES G. CLARK AND GROVE COTHRAN, OF SUMMITVILLE, INDIANA, ASSIGNORS OF ONE-HALF TO GUSTON O. CLARK AND EZRA Y. COMSTOCK, OF SUMMITVILLE, INDIANA.

CARBURETER.

SPECIFICATION forming part of Letters Patent No. 689,460, dated December 24, 1901.

Application filed March 23, 1901. Serial No. 52,557. (No model.)

*To all whom it may concern:*

Be it known that we, JAMES G. CLARK and GROVE COTHRAN, citizens of the United States, residing at Summitville, in the county of Madison and State of Indiana, have invented certain new and useful Improvements in Carbureters; and we do hereby declare the following to be a full, clear, and exact description of the invention, such as will enable others skilled in the art to which it appertains to make and use the same.

This invention relates to the production of gas from crude petroleum for illuminating and heating purposes, the object being to provide an apparatus of simple, novel, and compact construction and which will utilize all sedimentary matter, the same being drawn off and vaporized.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of an apparatus constructed in accordance with and embodying the vital features of the invention. Fig. 2 is a detail section of the apparatus. Fig. 3 is a horizontal section on the line X X of Fig. 2.

Corresponding and like parts are referred to in the following description and indicated in all the views of the drawings by the same reference characters.

In its general organization the apparatus comprises a heater 1 and a carbureter 2, the heater being provided to fix the gas and to vaporize liquid particles with which the gas may be laden. Another important feature of the heater is to convert the residue or sediment into available form for consumption at the burner.

The carbureter consists of a tank or receptacle 3, in which the gas-producing agent 4 is located and which by preference consists of crude petroleum, although it is contemplated within the purview of the invention to utilize volatile hydrocarbon of any nature. Combined with the tank 3 is means for forcing air therethrough to become enriched with carbon, so as to produce a gaseous mixture for use either as an illuminant or for heating purposes. A blast-pipe 5 passes centrally through the upper end of the tank, to within a short distance of the bottom thereof, and is provided at its lower end with a series of radial branches 6, perforated along their upper sides for the escape of the air in minute jets. This blast-pipe 5 may communicate with an air-pump 7, a steam-generator, or any means for creating a current through the carbureter. A check-valve 8 is located in the length of the blast-pipe 5 to prevent the escape of gas or the gas-producing agent therethrough when the blast-creating means is not in operation. The bottom of the tank is elevated, as shown at 9, so as to form a chamber 10 therebelow for the concentration and retention of a heating agent, whereby the crude petroleum in the tank is heated, when desired, so as to secure the best results and enable the hydrocarbon to be taken up more readily by the blast or current of air or steam passing through the said tank.

The heater 1 may be of any type and, as shown, comprises a casing 11 and a vertical coil 12, one end of which is connected by a pipe 13 with the upper portion of the carbureter and the other end of which is in communication with the distributing-pipe 14, by means of which the gas is conveyed to the required point of use. A burner 15 connects with the pipe 14 and serves to heat the coil 12, through which the gaseous mixture passes. Another burner 16 connects with the pipe 14 and is the means for heating the gas-producing agent in the tank 3. It is to be understood that branch pipes and burners connect with and are supplied from the distributing-pipe 14 either for illuminating, heating, or other purposes. A valve 17 is located in the length of the pipe 13 to cut off communication between the heater and carbureter when desired. It is not necessary to heat either the carbureter or the coil 12; but superior results are attained by heating these parts.

In operating gas-producing machinery of the type hereinbefore described sedimentary matter invariably accumulates at the bottom of the tank or carbureter, and to get rid of this residue or accumulation is a problem which in the present instance has been solved by provision of the eduction-pipe 18, which enters the tank 3 and terminates at its lower end within a short distance of the bottom thereof, the upper end of said pipe connecting with the pipe 13 at a point between the heater and the valve 17. A valve 19 is provided in the upper portion of the eduction-pipe 18 to cut off communication between the pipe 13 or to regulate the outflow of the sedimentary matter from the carbureter. When the valve 19 is open, the residue or sediment precipitated or collected at the bottom of the tank 3 passes off through the pipe 18 into the pipe 13, thence into the heating-coil 12, and is vaporized or converted into gaseous form for consumption at the various burners, this action being due to the combined action of pressure and suction. The pressure results from the downward force exerted by the gaseous mixture in the upper portion of the tank upon the gas-producing medium 4, which tends to force the substratum or residue into and through the pipe 18. When the apparatus is in use, there is a current of the gaseous mixture through the pipe 13, and when the valve 19 is open this current creates a vacuum or suction in the pipe 18, which, supplemented by the downward pressure of the gaseous mixture upon the gas-producing agent 4, exerts and produces an outflow of the sedimentary matter through the pipe 18 into the pipe 13, and this matter commingling with the gaseous mixture is carried along thereby to the heater and is converted thereby into vapor or gaseous form for subsequent use for heating, lighting, or any industrial purpose for which gas is applied.

Having thus described the invention, what is claimed as new is—

The herein-described gas-producing apparatus, comprising a tank, an incased heating-coil, a valved pipe connecting the upper portion of the tank with the heating-coil, a blast-pipe communicating with the lower portion of the tank and having perforate branches at its lower end for distributing the blast through the gas-producing agent, a valved eduction-pipe extending through the tank to within a short distance of the bottom thereof and having connection at its upper end with the pipe connecting the heating-coil with the said tank, and a distributing-pipe having connection with the opposite end of the heating-coil and provided with burners for heating the said coil and tank, substantially as set forth.

In testimony whereof we affix our signatures in presence of two witnesses.

JAMES G. CLARK. [L. S.]
GROVE COTHRAN. [L. S.]

Witnesses:
GLADYS L. THOMPSON,
GENEVIEVE MATTHEWS.